3,111,519
PROCESS FOR THE PRODUCTION OF
MELAMINE
Jean Louis Emile Pomot, Neuilly, Emmanuel Jean
Francois Luzarreta, Toulouse, and Robert Léon Pierre
Bécanne, Pinsaguel, France, assignors to Office National
Industriel de l'Azote, Toulouse, Haute, Garonne, a
French body corporate
Filed May 24, 1960, Ser. No. 31,410
Claims priority, application France June 1, 1959
7 Claims. (Cl. 260—249.7)

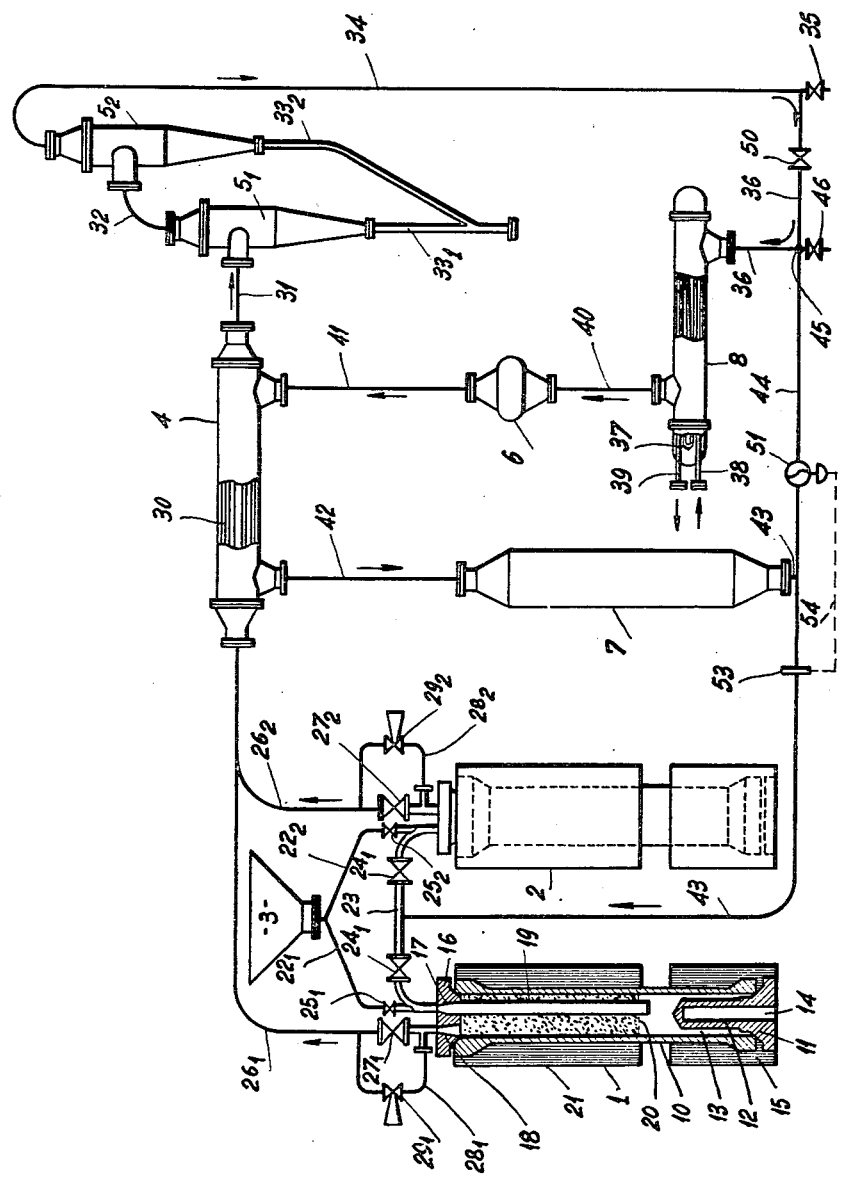

This invention relates to the production of melamine.

It is known that melamine can be produced from urea by heating either urea or a mixture of urea and ammonia in a corrosion-resistant autoclave.

According to the various works relating to this manufacture, the complete reaction takes place in accordance with the equation:

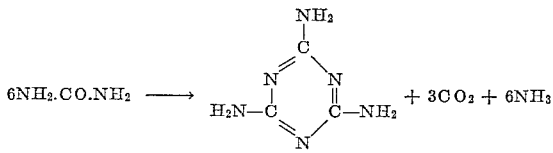

Processes based on this principle, notably those described in British specifications Nos. 598,175 and 583,504, involve more or less long heating periods between 10 minutes and 6 hours at temperatures between 350° and 600° C. and under high pressures which may reach 400 atmospheres. High yields, of the order of 95%, can be obtained only with relatively long heating periods, of the order of 6 hours at a temperature of 350° C., and of 2 hours at a temperature of 400° C.

It is also known that it is possible to obtain melamine by heating cyanuric acid and ammonia at 350° C. for 30 minutes.

S. N. Kasarnovski and I. I. Malkine ("Zurh. Priklad. Khim" 1957, 30, pp. 490-3) have shown that the best conditions for the formation of melamine are created by heating cyanuric acid and ammonia at 350° C. for 30 minutes under pressure. However, the yield obtained, calculated on the cyanuric acid employed, does not exceed 50–70% under these optimum conditions. Moreover, the crude melamine obtained contains considerable proportions of by-products. Under the best conditions mentioned by these authors, a mixture is obtained which is composed of 48% of melamine, 8% of urea and 7% of melamine cyanurate, the remainder consisting of ammonium carbonate. The work of these authors proves that in this case there is a partial decyclisation of the triazine nucleus with formation of urea, and that cyanuric acid cannot be quantitatively converted into melamine by direct reaction with ammonia.

It is an object of the present invention to provide a process for the production of melamine from cyanuric acid in which less severe temperature and pressure conditions can be used than are required in the processes referred to above. Other objects will become clear hereinafter.

In accordance with one feature of the invention, melamine is made by reacting urea and cyanuric acid in a molecular proportion of at least 3:1 at a temperature between 300° and 350° C. in a closed vessel, for example an autoclave.

The total reaction can be diagrammatically represented by the equation:

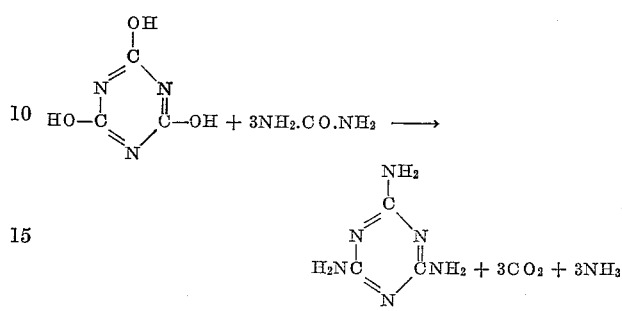

The many experiments carried out by the applicants have in fact proved that it is possible to convert cyanuric acid almost completely into melamine by operating at temperatures between 300° C. and 350° C., the reaction periods being between 5 and 60 minutes, and the pressure, which is spontaneously developed, being a function of the degree of filling of the vessel. However, the best yields are obtained by operating at about 320° C., say between 310° and 330° C., with a reaction period between 15 and 30 minutes.

In order that the pressure developed by the gases produced in the reaction may not reach values necessitating autoclaves resistant to very high pressure, it is desirable to limit the degree of filling of the autoclave, for example it should not exceed 350 g. of the mixture of cyanuric acid and urea per litre of autoclave if it is desired that the pressure developed at 310–320° C. should not exceed 400 atmospheres.

In fact, the applicants have found that the degree of filling which gives the best economic results, that is to say, with which medium-pressure autoclaves can be used, is between 100 and 150 g. of reaction mixture per litre of autoclave, the pressure developed under these conditions being in the neighbourhood of 80 atmospheres.

The autoclave may be fed either with powdered cyanuric acid and solid or fused urea or with a suspenion of finely divided cyanuric acid in fused urea, maintained at a temperature between 135° and 150° C.

The melamine formed in the autoclave may be extracted, in accordance with the method of application adopted, either by solution in hot water and crystallisation from the aqueous solution obtained, or by entrainment by means of a current of gas which is chemically inert to melamine under the conditions prevailing, more especially ammonia or, if necessary, nitrogen or hydrogen or a mixture of both, at a temperature such that the vapour pressure of the melamine is sufficient to empty the autoclave in an acceptable time, this temperature preferably being between 250° and 320° C.

The process according to the present invention may be carried out either discontinuously or in a semi-continuous cycle (for example with two autoclaves, one of which operates for the production of melamine, while there is extracted from the other the melamine produced at an earlier stage), or again continuously.

The invention is illustrated without limitation by the following example:

*Example*

Into a silver-lined soft-steel autoclave having a capacity of 400 cc. and tested at a pressure of 250 atmospheres are introduced the following substances:

|  | G. |
|---|---|
| Cyanuric acid | 20 |
| Urea | 28 |

The temperature is rapidly raised to 320° and maintained at this value for 30 minutes, the pressure developed reaching 85 atmospheres.

The autoclave is thereafter cooled to ambient temperature and the pressure is reduced to atmospheric pressure, the ammonia and the carbon dioxide gas formed being allowed to escape.

The contents of the autoclave are taken up in 400 cc. of water heated at 100° C. and the melamine formed is completely dissolved.

On concentration of the resulting aqueous solution and crystallisation there are obtained 19.27 g. of pure melamine, i.e. a yield of 98.9% calculated on the cyanuric acid and on the urea employed.

The invention comprises further an embodiment of the above process designed notably with a view, on the one hand, to facilitating the use of the starting reactants, whether in discontinuous operation or in semi-continuous cyclic operation, and on the other hand to improving the process when it is carried out in a semi-continuous cycle, and to providing an apparatus appropriate for the application of this procedure.

Regardless of whether the process be carried out discontinuously or in a semi-continuous cycle, it has been found that it is technically more convenient, instead of feeding the autoclave or autoclaves separately with cyanuric acid in powder form and solid or fused urea, or with a suspension of cyanuric acid in fused urea, as described above, to feed the autoclave or autoclaves with grains of a solid homogeneous mixture of cyanuric acid and urea, which grains may have various forms, such as balls, pellets, cylinders, sticks, etc. However, it is preferable for the grains to have a form which is particularly favourable to a high rate of flow during the feeding and which affords a high apparent density.

For example, it is advantageous from the practical viewpoint to make the grains by extruding through a nozzle the stoichiometric mixture (1 molecule of cyanuric acid to a 3 molecules of urea), previously brought to a pasty consistency by fusion of the urea (for example at a temperature between 135° and 150° C.), and cutting the continuous length obtained at regular intervals. The diameter of these continuous lengths may vary within a fairly wide range, for example between 2 and 10 millimetres. It is preferable for the cutting to be effected in such manner that the length of the cylinders is nearly equal to their diameter.

An important advantage of the grain feed is that it is possible to introduce the grains into a vessel at a temperature above the melting temperatures of the urea, notably at temperatures above 300° C., without any solid deposition resulting on the walls along which the grains travel within the vessel during the charging, more especially on the wall of an admission tube extending into the said vessel as will hereinafter be described. If the reaction mixture is introduced in the form of powder or paste, it is found that the urea contained in the mixture is converted, on contact with the hot walls, into thermal decomposition products, which adhere strongly to the said walls and are thus likely to cause stoppages.

In normal operation, if it is desired to avoid any loss of heat and time, it is necessary to introduce a fresh charge immediately after the entrainment, by means of an inert gas at a temperature above 300° C., of the melamine which has formed in the course of the previous reaction.

In accordance with another feature, the reaction is carried out in a vessel comprising a lower part in which the reaction proper takes place and which is heated at a temperature between 300° and 400° C., preferably between 320° and 380° C., and an upper part comprising obstacles conducive to the deposition of the melamine produced and vapourised in the bottom, this upper part being maintained at a lower temperature, between 225° and 275° C., preferably at about 250° C., say 240–260° C.

In this vessel, the temperatures at the bottom and at the top are maintained for the time necessary for the complete transformation of the cyanuric acid into melamine. This time may vary between 10 and 45 minutes, depending upon the temperature at which the reaction takes place. For example, for a temperature of about 350° C., the complete reaction time is approximately 30 minutes. In this case, the spontaneous pressure which is developed in the course of the reaction with a charge of 120 kg. per cubic metre of autoclave may rise to about 100 atmospheres.

In order that there may be available in the lower part of the vessel occupied by the solid charge a heat exchange surface between the charge and the heating means which is as large as is compatible with the mechanical strength of the walls of the vessel under the existing conditions of pressure, it is advantageous to give this part the form of an annular space of small thickness in relation to its mean diameter, so that the charge is situated between two neighbouring walls, of which at least one is heated, while the other may itself be either heated or heat-insulated.

The obstacles provided in the upper part of the vessel have the object of providing surfaces for the deposition of the melamine, on which the latter will condense in crystalline layers which will be thinner in proportion as the surface offered is larger, and from which it can then be more readily removed by sweeping with a current of hot inert gas. In addition, a large surface of such obstacles is conducive to the dissipation of the calories evolved in the condensation of the melamine. Such obstacles may be fixed to the inner wall of the vessel in this part, for example in the form of partitions, fins or similar surface irregularities. It is however more convenient from the industrial viewpoint to make these obstacles separate from the inner wall, for example in the form of packing bodies, such as chips or Raschig rings or in the form of a coil of large surface through which there flows an auxiliary fluid at variable temperature, which temperature must be at least 100° C. lower than that of the reaction zone. The said coil may be used alone or in combination with the filling bodies.

Generally speaking, it is advisable to make the obstacles of a material which cannot be attacked by the reactants and reaction products and which is a good conductor of heat, more especially silver. Filling bodies of graphite may also be used.

An apparatus suitable for carrying out the process in a semi-continuous cycle may comprise an inert gas circuit including at least two autoclaves arranged in parallel, with shut-off valves permitting the inclusion of only one autoclave in the circuit at a time, a heat exchanger, a means for separating gas and solid particles, a cooler, a gas circulating device and a heater, these means being arranged in an order such that the effluent from the reaction vessel passes successively through the heat exchanger, the separator, the cooler, the gas circulating device, the other side of the heat exchanger, the heater, and back to the same or another reaction vessel.

The invention is further illustrated in the accompanying drawing, in which the single FIGURE is a diagram, partly in section, of the apparatus.

The apparatus is shown as comprising only two identical autoclaves 1 and 2.

The essential part of the autoclave 1 consists of a force tube 10, that is to say, a thick tubular member whose height is large in relation to its internal diameter, in the present instance at least four times, and advantageously eight times, the said diameter. The tube 10 may be a conventional tube of forged steel internally lined with metal which is resistant to corrosion under the operating conditions, more especially a plated silver sheet. It is alternatively possible, although this is less recommended, to make the tube of one of the commercial alloys having a low iron content which are resistant to corrosion.

The tube 10 is closed at the bottom by a plate 11 comprising a cylindrical portion 12 which projects within the tube 10 so as to define with the lower part of the tube, an annular chamber 13 of small thickness in relation to its mean diameter and which receives the charge of cyanuric acid and urea. The plate 11 and its cylindrical portion 12 are preferably formed with a cavity 14 which is either filled with thermal insulation, such as diatomaceous earth, or contains an additional heating device.

Along the length of the annular chamber 13, the tube 10 is surrounded by a heating device 15 intended to bring the charge to the reaction temperature. The said heating device is preferably an electric induction heating device. Alternatively, an electric resistance heating device or a device for heating by means of a heat-carrying fluid, for example a liquid (thermofluid) or a gas (superheated gas or fumes), may be provided.

The tube 10 is closed at the top by a cover 16 formed with an inlet orifice 17 and an outlet orifice 18, the first orifice carrying a tube 19 for the introduction of the charge, which tube penetrates through the force tube 10 into the neighbourhood of the annular chamber 13.

The end plate 11 and its cylindrical portion 12, the cover 16 and the tube 19 are of similar construction to the force tube 10 for the purpose of protection against corrosion, as hereinbefore explained.

The force tube 10 comprises above the lower end of the introduction tube 19 a transverse foraminiferous or perforated partition 20 for maintaining a charge of filling bodies 21 which occupies the entire height of the tube 10 above the partition.

Disposed above the autoclaves 1 and 2 is a grain feeding device diagrammatically shown as a hopper 3 comprising pipes $22_1$, $22_2$ leading into the autoclaves 1, 2 respectively. The pipes $22_1$ and $22_2$ open into a gas pipe 23 connecting the orifice 17 of the autoclave 1 with the corresponding orifice of the autoclave 2, shut-off valves $24_1$, $24_2$ being provided in the pipe 23 in the neighbourhood of the autoclaves, while valves $25_1$, $25_2$ are provided in the pipes $22_1$, $22_2$.

Extending from the outlet orifices of the autoclaves (orifice 18 in the case of the autoclave 1) are gas ducts $26_1$, $26_2$, which merge together and lead to a heat exchanger and which contain main valves $27_1$, $27_2$. Disposed on either side of the latter are branches $28_1$, $28_2$ containing gas discharge valves $29_1$, $29_2$ of smaller cross-sectional area than the main valves $27_1$, $27_2$.

The heat exchanger 4 may be of any appropriate type. It is here shown as a cluster of tubes 30 connected to the pipes $26_1$, $26_2$, so that the effluent coming from the said pipes flows through the interior of the said cluster of tubes. On the opposite side, the tubes 30 open into a pipe 31 leading to a device for separating gas and solid particles. Any appropriate separating device may be provided. That shown in the drawing consists of a battery of two cyclones $5_1$, $5_2$ connected in series by a pipe 32 for the passage of gaseous suspension, their outlet collectors being provided with descending pipes $33_1$, $33_2$, which merge together, and at the bottom of which the separated melamine is collected.

Extending from the second cyclone $5_2$ is a gas discharge pipeline which comprises a shut-off valve 35 and leads, downstream of the latter, to an installation for the recovery of ammonia (not shown). Branched from the upstream side of the shut-off valve 35 is a gas return duct 36 comprising a shut-off valve 50 and leading to a cooler 8, which may be a heat exchanger of any type for the transfer of heat to a cooling fluid. As illustrated, the cooler contains a tubular coil 37 with an inlet 38 and outlet 39 for a cooling fluid. Extending from the outlet of the cooler 8 is a gas duct 40 leading to the inlet of a gas circulating device 6, for example a blower, the outlet of which is connected by a duct 41 to the heat exchanger 4 so as to lead the gas into the intertublar space thereof.

Extending from the heat exchanger 4 is a duct 42 leading to the inlet of a heater 7 of an appropriate type for raising the temperature of the gas coming from the heat exchanger. A duct 43 extends from the outlet of the heater 7 to the pipe 23.

A communication pipe 44 is provided between the duct 43 and the duct 36 (downstream of the valve 50), while there is branched from the said communicating duct a pipe 45 for the supply of inert gas, with a shut-off valve 46.

Disposed in the pipe 44 is a butterfly valve 51 and in the duct 43, beyond the point at which the latter is connected to the pipe 44, a diaphragm device 53 responding to the gas flow passing therethrough, the diaphragm being connected to the valve 51 so as to open the latter when the flow exceeds a certain value and thus to permit an excess volume of gas leaving the heater 7 to be taken up by the blower 6. When the valves $24_1$ and $24_2$ are both closed, the valve 51 is opened in order to avoid stopping the blower 6.

The apparatus is employed in the following manner:

With the valves $24_1$, $27_1$, $29_1$ and $25_2$ closed, the valve $25_1$ is opened for introducing into the autoclave 1 grains coming from the feed device at a predetermined charge rate between 100 and 150 kg., preferably 120 kg., per cubic metre of autoclave. The first charge may be introduced into a cold autoclave, but subsequently, in the course of production, each charge is introduced immediately after the entrainment, by means of hot inert gas, or the melamine formed in the preceding operation.

The valve $25_1$ is then closed and the lower part of the autoclave is brought by means of the heating device 15 to a temperature between 300° and 400° C., preferably between 320° and 380° C., while the temperature of the upper part is maintained between 225° and 275° C., preferably in the neighborhood of 250° C.

After completion of the reaction, at the end of the time hereinbefore indicated, the valve $29_1$ of small cross-section is opened, without stopping the heating, in order to discharge the gas and to bring the pressure in the autoclave 1 substantially to atmospheric. The gases, consisting essentially of a mixture of carbon dioxide and ammonia together with a little melamine entrained by the expansion, are admitted through the pipe $26_1$ into the tubes 30 of the heat exchanger.

The gases are successively fed through the pipe $3_1$ to the cyclones $5_1$ and $5_2$, in which they are freed from small quantities of entrained melamine. From there, the gases are directed through the duct 34 beyond the valve 35, which is open while the valve 50 is closed, to the installation for the recovery of ammonia.

When the pressure in the autoclave 1 has reached atmospheric pressure, the valves 24, 27 and 50 and if desired the valve 46 for the intake of inert gas are opened, and the valve 35 is closed in order that there may be set up, with the blower in operation, an inert gas circuit extending successively through the intertubular chamber of the heat exchanger 4, the heater 7, the upper part of the autoclave 1, the tubes 30 of the heat exchanger 4, the cyclones $5_1$, $5_2$ and the cooler 8. The inert gas is preferably nitrogen. The heating in the heater 7 is so adjusted that the inert gas is brought to a temperature between 290° and 350° C., preferably to the neighborhood of 320° C. The blower 6 is designed to provide a flow of from 30 to 50 cubic metres (reckoned at 0° C. and 760 mm. Hg) per hour per kg. of melamine to be entrained by sublimation. For example, it is calculated that with a mean rate of flow of 4000 cubic metres per hour and with an autoclave capable of producing 100 kg. of melamine per charge, the sublimation is complete in about 30 minutes.

In the heat exchanger 4, the inert gas coming from the blower 6 flows in counter-current to the hotter gas leaving the autoclave 1 and it is thus brought to a temperature of about 250° C. The heater 7 is so adjusted as thereafter to raise the temperature of the gas to about 320° C.

In passing through the tubes 30 of the heat exchanger 4, the gas charged with melamine vapours is cooled to about 130° C., and the melamine is separated therefrom in the solid state in the cyclones $5_1$, $5_2$.

In the cooler 8, the temperature of the gas is lowered to a value compatible with satisfactory operation of the blower 6. With the blowers now on the market, this temperature can be fixed in the range from 75° to 100° C.

The autoclave 2 operates under the same conditions as the autoclave 1, but it is in the gas extraction and sublimation phase while the autoclave 1 is in the charging and reaction phase.

The apparatus described can operate entirely automatically by servo-control of the various valves, the charging and reaction phase in the above-described example having to be of exactly the same duration as the gas extraction and sublimation phase.

If, for example, it is desired to reduce the temperature of the entrainment gas, whereby the sublimation phase is lengthened, it may be necessary to provide one or more additional autoclaves connected in parallel with the previously mentioned autoclaves so as to balance the various phases of the cycle.

An apparatus operating in a semi-continuous cycle as hereinbefore described is capable of producing from 1000 to 1250 kg. of melamine per useful cubic metre of autoclave every 24 hours. For example, if the autoclaves 1 and 2 each have a capacity of 1 cubic metre, the apparatus will produce from 2 to 2.5 tons of melamine every 24 hours.

The sublimated crude product has a purity equal to or higher than 98%, and it is completely water-soluble and has no parasitic colouration, notably when the metal employed for lining the autoclaves is silver.

We claim:

1. Process for the production of melamine, which comprises feeding into a reaction zone a suspension consisting of finely divided cyanuric acid in fused urea in a molecular ratio of urea to cyanuric acid of 3:1 respectively, and heating said suspension in the reaction zone to a temperature between 300° and 350° C., under constant volume conditions.

2. Process for the production of melamine, which comprises feeding into a reaction zone a granular composition consisting of a homogenous mixture of urea and cyanuric acid in molecular ratio of 3 mols of urea per one mol of cyanuric acid, and heating the said composition in said reaction zone to a temperature between 300° and 350° C. under constant volume conditions.

3. Process according to claim 2, wherein the said granular composition consisting of urea and cyanuric acid in the proportion of three mols of urea per mol of cyanuric acid is made by extruding a pasty dispersion of cyanuric acid in fused urea into continuous lengths, and cutting said lengths at intervals.

4. Process according to claim 3, wherein the amount of said granular composition is 100–150 g. for each litre of reaction space.

5. Process according to claim 1, wherein the amount of the reactants is at most 350 g. for each litre of reaction space.

6. Process according to claim 1, wherein the amount of said suspension is 100–150 g. for each litre of reaction space.

7. A method of producing melamine which comprises establishing an annular reaction zone and a packed condensation zone in vapor connection therewith, maintaining a temperature in the range of about 300° to about 400° C. in said annular reaction zone and a temperature in the range of about 225° to about 275° C. in said condensation zone, feeding a charge mixture of urea and cyanuric acid in the ratio of three mols of urea to one mol of cyanuric acid into said annular reaction zone, reacting said urea and cyanuric acid to product melamine, volatilizing said produced melamine, flowing said volatilized melamine into said condensation zone, condensing said melamine on the packing in the aforesaid packed condensation zone, flowing an inert gas at a temperature in the range of about 290° to about 350° C. through at least said condensation zone to sublimate said condensed melamine and to obtain a gaseous stream containing entrained melamine, flowing said gaseous stream containing entrained melamine from said packed condensation zone, and condensing said entrained melamine.

References Cited in the file of this patent

UNITED STATES PATENTS

| | | |
|---|---|---|
| 2,566,230 | Mackay et al. | Aug. 28, 1951 |
| 2,760,961 | Mackay | Aug. 28, 1956 |
| 2,783,131 | Mackay et al. | Feb. 26, 1957 |
| 2,815,269 | Saunders et al. | Dec. 3, 1957 |
| 2,918,467 | Hibbitts et al. | Dec. 22, 1959 |
| 2,943,088 | Westfall | June 28, 1960 |

FOREIGN PATENTS

| | | |
|---|---|---|
| 552,949 | Canada | Feb. 11, 1958 |
| 598,175 | Great Britain | Feb. 12, 1948 |